Patented Dec. 13, 1949

2,491,028

UNITED STATES PATENT OFFICE 2,491,028

LUBRICATING GREASE COMPOSITIONS

Alan Beerbower, Baltimore, Md., and Arnold J. Morway, Clark, N. J., assignors to Standard Oil Development Company, a corporation of Delaware No Drawing. Application October 11, 1947, Serial No. 779,408

11 Claims. (Cl. 252—42)

The present invention relates to lubricating grease compositions and particularly to greases of improved viscosity-temperature characteristics having desirable adhesive and non-spatter properties.

It has been suggested previously that greases of good viscosity-temperature characteristics may be prepared by using certain esters as the lubricating medium with lithium soap as thickening agents. A prior patent, No. 2,436,347, issued on a copending application, Serial No. 570,784, filed December 30, 1944, by John C. Zimmer and Arnold J. Morway, shows that a number of esters having the general formula $R_1OOC(R)COOR_2$, where R is a bivalent aliphatic hydrocarbon radical, and $R_1$ and $R_2$ represent alkyl radicals, have excellent lubricating properties and excellent temperature characteristics.

As further described in said Zimmer and Morway patent, greases which have particularly desirable low-temperature characteristics may be prepared by using the aliphatic dibasic acid esters, such as esters of aliphatic dicarboxylic acids, for example, esters of malonic, succinic, glutaric, azelaic and sebacic acids, among others.

It is also known that certain polymers, such as polybutene, may impart a certain tackiness or stringiness to mineral oil greases, but such polymers are somewhat deficient in stability when subjected to severe mechanical working, as in certain types of grease dispensing equipment. In addition, such polymers are otherwise deficient when used with ester type lubricants, as pointed out more fully below.

The present invention relates to specific improvements in the ester type greases referred to in said copending application and is particularly concerned with imparting adhesive or tacky properties to such greases. It has been found that most of the polymers commonly used for imparting stringiness and adhesive properties for lubricants are not suitable for use in ester type lubricating greases. For example, stringiness agents, such as polyisobutylene, which are widely used in many lubricants, are quite insoluble in esters of the character referred to above.

On the other hand, ordinary methacrylate type polymers which also have been used as mineral oil thickeners, for example in hydraulic oils, are unsuitable for use with the dibasic acid esters because they are so extremely soluble in the esters that they do not impart appreciable thickening properties thereto. Hence they do not lend the desired adhesive or stringiness properties to lubricating compositions of the ester type. It appears to be necessary to employ as a tackiness agent, a polymer having only a moderate or borderline degree of solubility in the major components of the grease. One of the objects of this invention is to select a compound having the desired marginal solubility characteristics and having also adhesive or tacky properties which are not destroyed by the ester, soap or other grease ingredients.

We have found that ester type greases may be thickened and rendered tacky and adhesive in character by the use of certain polymers of acrylic acid iso-alkyl derivatives. For example, a suitable material is isobutyl methacrylate polymer of relatively high molecular weight, for example, in the range from 50,000 to 400,000 preferably from 100,000 to 300,000. The solubility of this polymer in dibasic acid esters, such as di-2-ethylhexyl sebacate, is in the desired marginal solubility range to impart stringiness without the polymer separating from the oil phase because of too high a degree of insolubility or providing merely a slight thickening action because of too high a degree of solubility.

A typical composition according to the present invention may consist of 3 to 25% by weight of lithium soap, such as lithium stearate, 97 to 70% of a dibasic acid aliphatic ester, for example, di-2-ethylhexyl sebacate, and 0.1 to about 5% of an iso-alkyl methacrylate polymer, for example, isobutyl methacrylate polymer, said polymer having a molecular weight ranging between 50,000 and 400,000, preferably between about 200,000 and 300,000.

More specifically, an example of a preferred composition may be given as 13% by weight of lithium stearate, 86.5% of di-2-ethylhexyl sebacate, and 0.5% of isobutyl methacrylate. The resulting grease is a smooth, opaque, stringy material which shows less tendency to separate the oily ester than the corresponding lithium stearate-ester grease made without the polymer. The grease shows good resistance to spattering when subjected to sudden shock loading which is requisite for operation at elevated temperatures.

A grease having the composition just described may be prepared as described in the aforesaid patent. Preferably the soap is made first by reacting a suitable fatty material such as tallow, stearic acid, hydrogenated fish oil acids, or the like, with the appropriate saponification agent, preferably an alkali metal hydroxide, e. g. sodium, potassium, or lithium. The soap thus formed may be dried, and may be powdered, if desired, to facilitate its solution in the liquid ester. On the other hand, in the case of certain metal hydroxides or oxides used to saponify the fatty material, such as lithium, calcium, magnesium, or aluminum hydroxides, the soap may be prepared by the well known process of precipitation from water.

The required amount of soap is then added to the ester and the mixture is heated to a temperature of about 300° to 450° F., preferably 350° to 400° F., until the soap is completely melted in the ester. Thereafter the polymer and other modifiers are added, preferably during cooling while mechanical mixing is continued. Generally it is preferred to add the modifiers after the temperature has dropped materially, e. g. after the temperature has been brought down to about 250° or 200° F.

It will be understood that the quantities of lithium or other metal soap and of the methacrylate polymer may be varied somewhat depending upon the final characteristics desired. Thus the soap content may be varied from 3 to 25% by weight based on the total composition and the methacrylate polymer may be used in quantities as little at 0.1% to as much as 5% or more, on the same basis.

In lieu of di-2-ethylhexyl sebacate, most of the various other dibasic acid esters enumerated above and more fully described in said copending application may be employed. Esters such as isobutyl sebacate, and in general, the esters of dibasic acids having 3 to 12 carbon atoms, such as malonic, succinic, isosuccinic, glutaric, ethyl malonic, pyrotartaric, adipic, pimelic, suberic, azelaic, and sebacic acid are suitable. Instead of one of the acids enumerated above, any acid or mixture of acids having the general formula HOOC(R)COOH may be used where R is a bivalent aliphatic hydrocarbon radical. Any of these esters may be used also in combination with moderate quantities of mineral base lubricating oil of appropriate viscosity. Various synthetic aliphatic acids produced by the polymerization or dimerization of unsaturated fatty acids or their esters may be used as will be understood by those skilled in the art. The acids themselves are preferably saturated but the unsaturated acids also may be used.

As indicated briefly above, the esters employed have the general formula.

where R is a bivalent aliphatic hydrocarbon radical such as methylene, polymethylene, ethylidene, propylidene, methyl dimethylene, butenylidene, and the like, and $R_1$ and $R_2$ are similar or dissimilar hydrocarbon radicals, such as branched chain alkyl, and cycloalkyl, radicals. Secondary butyl, cyclohexyl, and secondary octyl phenyl are representative of the radicals $R_1$ and $R_2$. Esters containing aromatic nuclei are not considered satisfactory because of their poor viscosity index. The esters may contain additional substituents or functional groups such as Cl, Br, $NH_2$, NHR, $NR_1R_2$, CHO, CO, SH, SR, RSSR, ROR, and RO-Metal. They may be prepared by any of the methods known to the prior art. One particular method of preparing the ester is to react the alcohol with the acid at elevated temperatures in the presence of a suitable esterification catalyst such as sulfuric acid, sulfosalicylic acid, etc., as set forth more fully in the aforesaid copending application.

It will be understood that lubricating compositions of this invention may contain varying proportions of esters with other ingredients such as mineral oil or other esters. It will also be understood that various oxidation inhibitors, such as phenolic or amine types, for example, phenyl alpha naphthylamine, may be employed in suitable proportions. Other suitable oxidation inhibitors are, phenyl beta naphthylamine, aldol alpha naphthylamine, ditertiary butyl para cresol, and the like, with or without synergistic agents, such as ammonia-formaldehyde di-isobutyl condensation product. Other or additional ingredients, such as oiliness agents, rust inhibitors, extreme pressure additives, and the like, may be included as will be apparent to those skilled in the art.

While lithium stearate has been specifically mentioned as the preferred composition for thickening the ester-type lubricant to a grease, it will be understood that various other materials may be substituted. Thus other soaps of lithium, such as those derived from hydrogenated fish oil acids, may be employed. Soaps of other metals such as barium, calcium and sodium may be employed. In general, lithium soaps of preferably saturated or substantially saturated fatty acids having 12 to 24 carbon atoms per molecule are preferred but the soaps of corresponding unsaturated acids, or of mixtures of such saturated and unsaturated, may be used.

In lieu of soaps, other thickening agents which are suitable for imparting grease-like structure to the lubricant may be employed. Among these are carbon black, especially acetylene black which has pronounced structural characteristics, silica gel, and silica of the type which is prepared by condensing the smoke from heated ethyl silicate.

It will be understood further that although the particular polymer, isobutyl methacrylate, is preferred for use with the dibasic esters of branched chain alcohols, such as the isopropyl, secondary butyl and 2-ethylhexyl derivatives, other iso-alkyl methacrylate polymers may be used, provided their solubility characteristics and tackiness and stringiness properties in the particular lubricant are comparable with those of isobutyl methacrylate polymer in, say di-2-ethylhexyl sebacate. The polymer should be just moderately soluble in the ester or ester-containing liquid lubricant, as noted above. Other polymers of a similar nature may be used, such as isopropyl, normal butyl, and various amyl methacrylates, provided their solubility range is suitable.

The liquid lubricant which forms the basis of the improved greases included in the present invention may be composed entirely of a single dibasic acid ester of branched chain alcohol, or it may consist of a mixture of several such esters. Further, it is found that esters of this character may be mixed in various proportions with mineral base lubricating oil of appropriate grade and viscosity. In general, the ester content of the liquid should be 75% or at least 50% by weight of the finished grease composition. The remainder may be mineral oil or another ester, or mixtures thereof, thickened by a suitable soap, carbon black, silica gel, or other inorganic thickeners.

Regarding the esters of the type $COOR_1(R)COOR_2$, where R is an aliphatic bivalent hydrocarbon, the branched chain radicals $R_1$ and $R_2$ preferably are those having not less than three and not more than about 12 carbon atoms each. $R_1$ and $R_2$ may be alike or dissimilar. The dibasic acid radical preferably has not less than 3 nor more than 12 carbon atoms, those having from 3 to 10 carbon atoms being preferred. These aliphatic compounds are preferably saturated, although unsaturated compounds may be used. They are not as readily available, as a rule, as the saturated compounds. As noted above, the aromatic compounds are not favored because of their usually low viscosity index.

We claim:

1. A tacky lubricating grease composition consisting essentially of 70 to 97% of a dibasic acid ester having the general formula

where R is a bivalent aliphatic hydrocarbon radical and $R_1$ and $R_2$ are branched chain hydrocarbon radicals, 3 to 25% of a lithium soap of essentially saturated fatty acids having 12 to 24 carbon atoms per molecule, and 0.1 to 5% of an $C_3$ to $C_5$ alkyl methacrylate polymer of molecular weight between 50,000 and 400,000, said polymer having a moderate but limited solubility in said ester so as to impart substantial tackiness and stringiness properties to said composition.

2. A lubricating grease composition consisting essentially of di-2-ethylhexyl sebacate containing 3 to 25% by weight, based on the total composition, of a lithium soap of a fatty acid having from 10 to 24 carbon atoms per molecule and 0.1 to 5% of isobutyl methacrylate polymer of molecular weight between 50,000 and 400,000 as a stringiness agent.

3. A lubricating grease composition consisting essentially of 70 to 97% by weight of dibasic acid ester of branched chain aliphatic alcohols wherein said acid radical contains 3 to 12 carbon atoms and said alcohol radicals contain 3 to 12 carbon atoms each, 3 to 25% of a grease type thickener, and 0.1 to 5% of polymerized isobutyl methacrylate having a molecular weight between 50,000 and 400,000.

4. A lubricating composition consisting essentially of a liquid lubricant composed of at least 50% by weight of an aliphatic dibasic acid ester of branched chain alcohols, 3 to 25% by weight of a thickening agent to impart a grease-like structure to said composition, and 0.1 to 5% of an $C_3$ to $C_5$ alkyl methacrylate polymer having a molecular weight range between 50,000 and 400,000 said polymer having moderate but limited solubility in said ester so as to impart substantial tackiness and stringiness properties to said composition.

5. A lubricating grease consisting essentially of 70 to 97% by weight of di-2-ethylhexyl sebacate, 25 to 3% of a thickener to impart a grease-like consistency to said sebacate, and 0.1 to 5% of an isobutyl methacrylate polymer having a molecular weight range between 100,000 and 300,000.

6. A lubricating composition consisting essentially of 70 to 97% of an ester of a dibasic acid having the general formula $COOR_1(R)COOR_2$ where R is a bivalent hydrocarbon radical, and $R_1$ and $R_2$ are branched chain hydrocarbon radicals, 3 to 25% of an alkali metal soap of fatty acid having 12 to 24 carbon atoms per molecule, and 0.1 to 5% of isobutyl methacrylate polymer of molecular weight range between 100,000 and 300,000.

7. A lubricating composition consisting essentially of di-2-ethylhexyl sebacate containing 3 to 25% by weight, based on the total composition, of lithium stearate and 0.1 to 5% of an isobutyl methacrylate polymer of a molecular weight range between 50,000 and 400,000.

8. A lubricating grease composition consisting essentially of 13% lithium stearate, 86.5% di-2-ethylhexyl sebacate and 0.5% of an isobutyl methacrylate polymer having a molecular weight range between 50,000 and 400,000 and having border line solubility characteristics in said other ingredients to impart stringiness to said grease composition.

9. A lubricating grease composition having adhesive properties consisting essentially of an oily lubricant containing 50% to 100% by weight of an aliphatic dibasic acid ester of branched chain alcohols and 50% to 0% of mineral oil, 3 to 25% by weight, based on the total composition, of a thickening agent to impart colloidal grease-like properties to said lubricant, and 0.1 to 5% of a marginally soluble $C_3$ to $C_5$ alkyl methacrylate polymer having a molecular weight range between 50,000 and 400,000.

10. Composition as in claim 9 wherein said polymer has a molecular weight range of 100,000 to 300,000.

11. Composition as in claim 9 wherein said polymer is isobutyl methacrylate.

ALAN BEERBOWER.
ARNOLD J. MORWAY.

REFERENCES CITED

The following references are of record in the file of this patent:

UNITED STATES PATENTS

| Number | Name | Date |
|---|---|---|
| 2,104,408 | Wiezevich | Jan. 4, 1938 |
| 2,274,673 | Earle | Mar. 3, 1942 |
| 2,409,333 | Wright et al. | Oct. 15, 1946 |
| 2,436,347 | Zimmer et al. | Feb. 17, 1948 |
| 2,448,567 | Zisman et al. | Sept. 7, 1948 |

OTHER REFERENCES

Haim et al., Synthetic Low Temperature Greases from Aliphatic Diesters, article in Industrial and Engineering Chemistry, vol. 39, pp. 500-506, April 1947.